INVENTORS
DAN UHLICH
and
MARVIN UHLICH

United States Patent Office 3,621,599
Patented Nov. 23, 1971

3,621,599
AUTOMATIC FISH CATCHER
Dan Uhlich and Marvin Uhlich, both of Main St.,
Anamoose, N. Dak. 58710
Filed Sept. 15, 1969, Ser. No. 857,927
Int. Cl. A01k 97/00
U.S. Cl. 43—15
1 Claim

ABSTRACT OF THE DISCLOSURE

A device for automatically hooking a fish during ice fishing comprising an upright frame upon which a reel may be removably mounted. A coil spring and a spring-biased pivoted lever are also mounted on the frame with a pin on the lever engaging the free end of the coil spring to retain the spring compressed. A fishing line extends from the reel to a hook member hooked over the outer end of the lever and from the hook member to a fish hook in the water. A pull on the line will cause the hook member to pivot the lever and disengage the pin from the end of the coil spring, thus freeing the spring to jerk the line and set the hook in the fish's mouth.

This invention relates generally to automatic fishing devices.

A principal object of the present invention is to provide an automatic fish catcher that is particularly suitable for ice fishing and wherein the fisherman is not obliged to attend at all times to the fishing line, thus allowing him to attend to other chores or to rest while the device is at all times ready so as to automatically hook a fish.

Another object of the present invention is to provide an automatic fish catcher positioned over a hole in an ice surface, the device including a frame that is readily collapsible so that it can be conveniently transported between a fisherman's home and the fishing area.

Still another object of the present invention is to provide an automatic fish catcher upon which a conventional fishing reel can be removeably secured, thereby permitting the reel to be alternatively used at other times by being attached upon a fishing pole.

Other objects of the present invention are to provide an automatic fish catcher which is simple in design, inexpensive to manufacture, rugged in construction, easy to use and efficient in operation.

Figure 1:
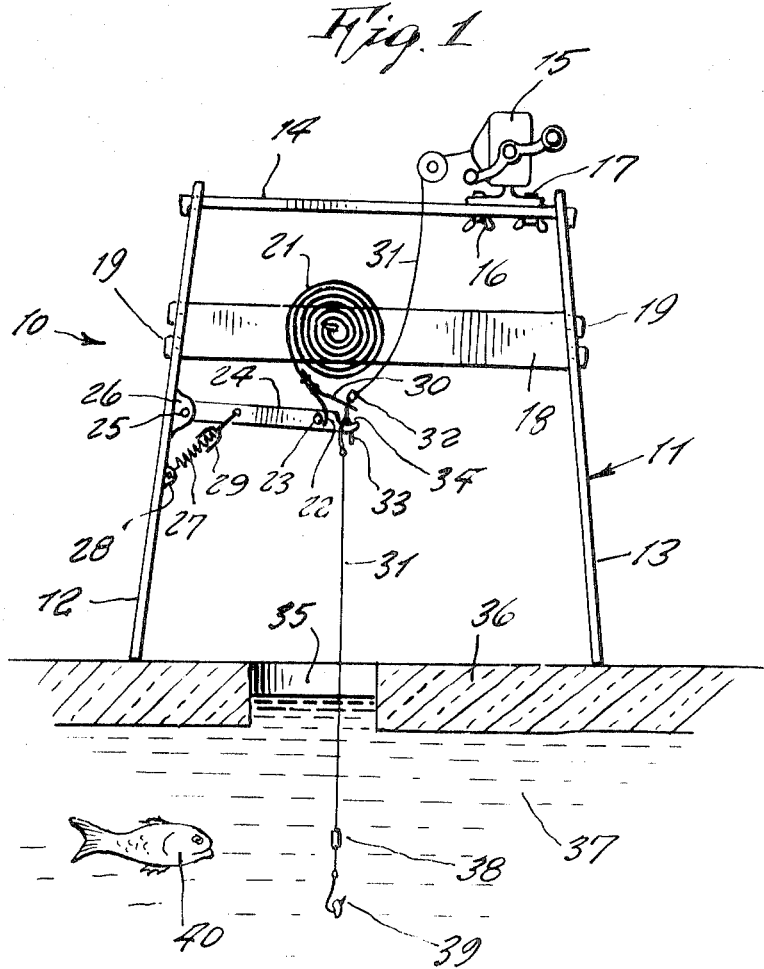
Figure 2:
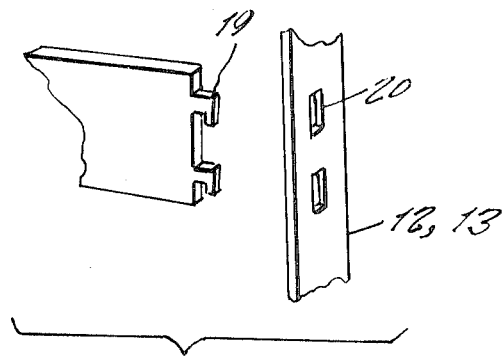

These and other objects will be readily evident upon a study of the following specification and the accompanying drawing wherein:

FIG. 1 is a side elevation view of the present invention shown in operative use in a fishing operation, and FIG. 2 is a fragmentary perspective view showing the fitting elements for setting up the fish catcher frame.

Referring now to the drawing in detail, the reference numeral 10 represents an automatic fish catcher, according to the present invention wherein there is a frame 11 comprised of a plurality of generally vertically extending supports 12 and 13, the upper ends of the supports engaging an upper cross bar 14 upon which a conventional fishing reel 15 can be removeably mounted by means of wing bolts 16 and nuts 17.

A lower cross bar 18 is supported between the supports 12 and 13 and is quickly and easily attachable thereto by the inter-fittting elements 19, 20 shown in FIG. 2 of the drawing.

The upper crossbar 14 is likewise provided with similar elements.

The inter-fitting elements of the cross bars 14 and 18 comprise a plurality of sideward-extending hooks 19 which are receivable within slotted openings 20 in the vertical supports 12 and 13 and wherein the hooks are simply easily inserted into the openings after which the bar is moved slightly sidewardly so to cause the hooks 19 to engage over one of the end edges of the holes 20. Thus a quick and easy means is provided for erecting and disassembling the frame.

Upon the lower cross bar 18, there is mounted a coil spring 21 with the inner end of the coil spring attached to the cross bar 18, the outer end of the coil spring being formed into a hook 22 for resting against a stop pin 23 mounted on one end of a catch lever 24. The opposite end of the catch lever 24 is mounted pivotally upon a pin 25 carried in a lug 26 formed on the support 12.

A compression spring 27 is attached at one end in an opening of a lug 28 formed on the support 12, the opposite end of the spring 27 being held within a cup 29 secured pivotally to an intermediate portion of the catch lever 24.

The coil spring 21 has a leaf 30 rigidly secured thereto adjacent to the end having the hook 22, the leaf 30 having an aperture therethrough through which a fishing line 31 from the reel 15 is received. The line 31 has an enlarged stop 32 attached thereto, the stop 32 being positioned above the leaf 30.

Below the leaf 30, the fishing line 31 is connected to a hook 33 that rests within a notch 34 upon the upper side of the catch lever 24, the fishing line 31 then extending downwardly from the hook 33 through the opening 35 in the ice 36 and into the water 37 wherein a lead weight 38 and fishing hook 39 are secured thereto.

In operative use, the device will be set up into an operative position as is illustrated in FIG. 1, wherein the device is set to catch a fish 40. When a fish strikes, the fishing line 31 below the hook 33 will be pulled by the fish, thus causing the catch lever 24 to be pivoted downwardly against the action of the spring 27. The downward pivotal movement of the catch lever will cause the hook 22 on the end of the coil spring 21 to slip off the pin 23, thus releasing the coil spring 21 which now jerks the line 31 upwardly and sets the hook in the fish's mouth.

It is readily evident that the stop 32 may be positioned along any portion of the line 31 thereby giving complete freedom in the depth of the hook 39. Thus there is provided an automatic fish catcher which will hook a fish without the necessary attention of a fisherman and allowing him therefore to either rest or attend to other chores.

What I now claim is:

1. An automatic fish catcher comprising an upright collapsible frame having uprights and at least one horizontal cross bar, a fishing reel supported on said cross bar, a coil spring mounted on said upright frame adjacent to said fishing reel, a pivotally mounted lever secured to an intermediate portion of one of said uprights and adapted to pivot about a horizontal axis, spring means connecting said lever to said upright frame and spring biasing an outer end of said lever upward to a position below said coil spring, said lever having a stop pin at its outer end, said coil spring having an outer end portion forming a hook to engage said stop pin on said lever, said pin retaining said coil spring in compressed position, a leaf extending from the outer end of said coil spring and having an aperture therethrough, a fishing line extending from said fishing reel and passing through said leaf aperture to a hook member interposed in the line at an intermediate portion thereof, said hook member being hooked over the outer end of said lever, the lowermost end of the fishing line having a fish hook thereon and adapted to extend into the water to be grasped by a fish, whereby when the fish hook is grasped by a fish, the grasping action will pull the hook member downward to pivot the lever and disengage the hooked outer end of the coil spring from the pin on the lever, thereby causing the coil spring to jerk the fishing line to imbed the fish hook in the mouth of the fish.

References Cited

UNITED STATES PATENTS

| | | | |
|---|---|---|---|
| 916,891 | 3/1909 | Schildbach | 43—15 |
| 2,554,927 | 5/1951 | Schultz | 43—16 |
| 2,791,857 | 5/1957 | Schrader | 43—16 |
| 3,169,335 | 2/1965 | Nalder | 43—15 |
| 2,194,088 | 3/1940 | Joabson | 43—15 |
| 2,871,614 | 2/1959 | Roff | 43—15 |

SAMUEL KOREN, Primary Examiner

D. J. LEACH, Assistant Examiner